United States Patent
Wang et al.

(10) Patent No.: US 12,351,693 B2
(45) Date of Patent: Jul. 8, 2025

(54) METHOD FOR PREPARING RESIN COMPOSITION, RESIN COMPOSITION AND MOLDED ARTICLE

(71) Applicant: Momentive Performance Materials Inc., Waterford, NY (US)

(72) Inventors: Cheng Wang, Shanghai (CN); Roy Rojas-Wahl, Teaneck, NJ (US)

(73) Assignee: Momentive Performance Materials Inc., Niskayuna, NY (US)

( * ) Notice: Subject to any disclaimer, the term of this patent is extended or adjusted under 35 U.S.C. 154(b) by 1008 days.

(21) Appl. No.: 17/263,572

(22) PCT Filed: Jul. 26, 2019

(86) PCT No.: PCT/US2019/043569
§ 371 (c)(1),
(2) Date: Jan. 27, 2021

(87) PCT Pub. No.: WO2020/028155
PCT Pub. Date: Feb. 6, 2020

(65) Prior Publication Data
US 2021/0301091 A1 Sep. 30, 2021

(30) Foreign Application Priority Data
Aug. 3, 2018 (CN) .......................... 201810876811.6

(51) Int. Cl.
| | | |
|---|---|---|
| C08L 83/04 | (2006.01) | |
| C08G 77/00 | (2006.01) | |
| C08G 77/12 | (2006.01) | |
| C08G 77/16 | (2006.01) | |
| C08G 77/18 | (2006.01) | |
| C08J 3/22 | (2006.01) | |
| C08K 5/098 | (2006.01) | |

(52) U.S. Cl.
CPC .............. *C08J 3/226* (2013.01); *C08G 77/12* (2013.01); *C08G 77/16* (2013.01); *C08G 77/18* (2013.01); *C08G 77/70* (2013.01); *C08K 5/098* (2013.01); *C08J 2367/00* (2013.01); *C08J 2369/00* (2013.01); *C08J 2383/04* (2013.01)

(58) Field of Classification Search
CPC ..... C08J 2367/00; C08J 2369/00; C08L 83/04
See application file for complete search history.

(56) References Cited

U.S. PATENT DOCUMENTS

| | | | | |
|---|---|---|---|---|
| 4,387,176 A | * | 6/1983 | Frye | C08K 5/098 524/588 |
| 4,487,858 A | | 12/1984 | Lovgren et al. | |
| 4,536,529 A | * | 8/1985 | Frye | C08K 5/0066 524/400 |
| 4,871,795 A | * | 10/1989 | Pawar | C08L 101/00 524/415 |
| 5,242,744 A | * | 9/1993 | Schryer | C08L 23/12 523/210 |
| 5,346,941 A | * | 9/1994 | Furukawa | C08L 83/04 524/588 |
| 5,624,985 A | | 4/1997 | Lucarelli et al. | |
| 5,844,031 A | * | 12/1998 | Chen | C08L 83/04 524/265 |
| 5,861,450 A | | 1/1999 | Chen et al. | |
| 2003/0065108 A1 | | 4/2003 | Beach et al. | |
| 2014/0371360 A1 | | 12/2014 | Zheng et al. | |
| 2021/0301091 A1 | | 9/2021 | Wang et al. | |

FOREIGN PATENT DOCUMENTS

| | | |
|---|---|---|
| JP | 60-110727 | 1/1993 |
| JP | 10-195308 | 7/1998 |
| JP | 06-157796 | 9/2017 |
| JP | 2021-0532247 | 12/2019 |
| WO | 2017109591 | 6/2017 |
| WO | 2018114901 | 6/2018 |

OTHER PUBLICATIONS

Patent Cooperation Treaty (PCT), International Search Report and Written Opinion for Application PCT/US2019/043569 filed on Jul. 26, 2019, mailed Dec. 12, 2019, International Searching Authority, EP.

* cited by examiner

*Primary Examiner* — Margaret G Moore
(74) *Attorney, Agent, or Firm* — James Abruzzo; McDonald Hopkins LLC

(57) ABSTRACT

A method for preparing a resin composition, comprising compounding a silicone composition comprising a polyorganosiloxane and a silicone resin soluble in the polyorganosiloxane with a first resin to form a master batch; and compounding the master batch with a second resin. A molded article comprising the resin composition has greatly improved impact strength.

13 Claims, No Drawings

… … …

METHOD FOR PREPARING RESIN COMPOSITION, RESIN COMPOSITION AND MOLDED ARTICLE

CROSS-REFERENCE TO RELATED APPLICATION

This application is a 35 U.S.C. § 371 national stage application of PCT Application No. PCT/US2019/043569 filed on Jul. 26, 2019, entitled "METHOD FOR PREPARING RESIN COMPOSITION, RESIN COMPOSITION AND MOLDED ARTICLE," which claims priority to Chinese Patent Application No. 201810876811.6 filed on Aug. 3, 2018, each of which are incorporated herein in their entirety by reference.

FIELD OF THE INVENTION

This invention generally relates to preparation of resin products. More particularly, this invention relates to a method for preparing a resin composition, a resin composition and a molded article comprising the resin composition with improved impact strength, and a use of a master batch obtained in the method of the present invention as an impact modifier for improving impact strength of a resin product.

BACKGROUND OF THE INVENTION

Resins such as polycarbonates and polyesters are synthetic thermoplastic resins, and are widely used in electronic devices and automobiles such as casings of electronic devices, cell phone components and automotive interiors due to light weight and good mechanical properties. As these resins are usually used to manufacture parts having a thin thickness, it is desirable to improve impact strength thereof.

SUMMARY OF THE INVENTION

In an aspect, the present invention relates to a method for preparing a resin composition, comprising:
(a) compounding a silicone composition with a first resin to form a master batch, the silicone composition comprising a polyorganosiloxane and a silicone resin soluble in the polyorganosiloxane; and
(b) compounding the master batch with a second resin.

In an embodiment, the first resin and the second resin are each independently a resin containing an ester group (C=O). In another embodiment, the first resin and the second resin are selected from a group consisting of a polyester resin, a polycarbonate resin and a combination thereof.

In another aspect, the present invention relates to a resin composition prepared in accordance to the method of the present invention.

In another aspect, the present invention relates to a resin composition comprising:
a master batch, wherein the master batch comprises a first resin compounded with a silicone composition; and
a second resin compounded with the master batch,
wherein the first resin and the second resin are each independently selected from a group consisting of a polyester resin, a polycarbonate resin and a combination thereof, and
wherein the resin composition when molded into an article has a tensile strength of at least about 60 MPa according to ASTM D638 at 25° C. and a Notched Izod impact strength of at least about 65 KJ/m$^2$ according to ASTM D256 at 25° C.

In another aspect, the present invention relates to a resin composition comprising:
a master batch, wherein the master batch comprises a first resin compounded with a silicone composition; and
a second resin compounded with the master batch,
wherein the first resin and the second resin are each independently selected from a group consisting of a polyester resin, a polycarbonate resin and a combination thereof, and
wherein the resin composition includes about less than 0.05 wt % of a metal organic salt, based on the total amount of the resin composition.

In another aspect, the present invention relates to a molded article comprising the resin composition prepared in accordance with the method of the present invention.

In yet another aspect, the present invention further relates to a use of the master batch obtained in the method of the present invention as an impact modifier for improving impact strength of a resin product.

Surprisingly, it has been found that the molded article comprising the resin composition has greatly improved impact strength. In an embodiment, the Notched Izod impact strength of the molded article is at least four times of the Notched Izod impact strength of the starting resin.

DESCRIPTION OF THE INVENTION

As used herein, the singular forms "a", "an", and "the" include plural referents unless the context clearly dictates otherwise. For example, reference to "a resin" encompasses a single resin as well as two or more resins, and the like.

As used herein, the terms "for example", "such as", or "comprising" are meant to introduce examples that further clarify more general subject matter. Unless otherwise specified, these examples are provided only as an aid for understanding the applications illustrated in the present disclosure, and are not meant to be limiting in any fashion.

Other than in the working examples or where otherwise indicated, all numbers expressing amounts of materials, temperatures, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art. The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Terms or words used in the description and claims should not be restrictively interpreted as ordinary or dictionary meanings, but should be interpreted as meanings and concepts conforming to the inventive concept on the basis of a principle that an inventor can properly define the concept of a term to explain his or her own invention in the best ways.

As used herein, the terminology "hydrocarbon group" means a straight chain or branched hydrocarbon group, preferably containing from 1 to 60 carbon atoms per group, which may be saturated or unsaturated and which may be optionally substituted or interrupted with one or more atoms or functional groups, such as, for example, hydroxy and oxy.

As used herein in reference to a hydrocarbon group, the term "monovalent" means that the group is capable of forming one covalent bond per group. Generally, a monovalent group can be represented as having been derived from a saturated hydrocarbon compound by conceptual removal of one hydrogen atom from the compound. For example, an ethyl group, that is, a —CH$_2$CH$_3$ group, is a monovalent group can be represented as having been derived by conceptual removal of one or more hydrogen atoms from the saturated hydrocarbon ethane.

Suitable monovalent hydrocarbon groups include acyclic hydrocarbon groups, alicyclic hydrocarbon groups and aromatic hydrocarbon groups. Preferred monovalent hydrocarbon groups are alkyl groups, aryl groups and aralkyl groups.

As used herein, the expression "acyclic hydrocarbon group" means a straight or branched chain hydrocarbon group, preferably containing up to 60 carbon atoms, which may be saturated or unsaturated and which may contain one or more hetero atoms, e.g., oxygen, nitrogen, etc., and/or one or more functional groups and/or atoms, e.g., hydroxyl, halo, especially chloro and fluoro, and the like, in substitution of a like number of hydrocarbyl hydrogen atoms.

Suitable monovalent acyclic hydrocarbon groups include, for example, alkyl, alkenyl, alkynyl, hydroxyalkyl, cyanoalkyl, carboxyalkyl, alkyloxy, oxaalkyl, alkylcarbonyloxaalkylene, carboxamide and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, butoxy, 2,5,8-trioxadecanyl, carboxymethyl, chloromethyl, trifluoromethyl, and 3,3,3-trifluoropropyl.

As used herein, the expression "alicyclic hydrocarbon group" means a group containing one or more saturated hydrocarbon rings, preferably containing from 4 to 12 carbon atoms per ring, which may optionally be substituted on one or more of the rings with one or more alkyl groups, each preferably containing from 2 to 6 carbon atoms per alkyl group, halo groups or other functional groups and which, in the case of a monovalent alicyclic hydrocarbon group containing two or more rings, may be fused rings. Suitable monovalent alicyclic hydrocarbon groups include, for example, cyclohexyl and cyclooctyl.

As used herein, the expression "aromatic hydrocarbon group" means a hydrocarbon group containing one or more aromatic rings per group which may optionally, be substituted on the aromatic rings with one or more alkyl groups, each preferably containing from 2 to 6 carbon atoms per alkyl group, halo groups or other functional groups and which, in the case of a monovalent aromatic hydrocarbon group containing two or more rings, may be fused rings. Suitable monovalent aromatic hydrocarbon groups include, for example, phenyl, tolyl, 2,4,6-trimethylphenyl, 1,2-isopropylmethylphenyl, 1-pentalenyl, naphthyl, anthryl.

As used herein, the term "aralkyl" means an aromatic derivative of an alkyl group, preferably a ($C_2$-$C_6$)alkyl group, wherein the alkyl portion of the aromatic derivative may optionally, be interrupted by an oxygen atom such as, for example, phenylethyl, phenylpropyl, 2-(1-naphthyl) ethyl, preferably phenylpropyl, phenyoxypropyl, biphenyloxypropyl, and the like.

In an aspect, the present invention relates to a method for preparing a resin composition. The method at least includes: (a) compounding a silicone composition comprising a polyorganosiloxane and a silicone resin soluble in the polyorganosiloxane with a first resin to form a master batch (hereinafter referred to as MB formation); and (b) compounding the master batch with a second resin (hereinafter referred to as the MB blending).

In an embodiment, the method may further includes one or more steps as needed, such as, pre-treating the silicone composition before the step (a); cooling and drying the silicone composition between steps (a) and (b); cooling and drying the silicone composition after step (b); and/or molding the resin composition into a desired shape (hereinafter referred as the molding step).

In another embodiment, the first resin and the second resin are each independently a resin containing an ester group (C=O). In a preferable embodiment, the first resin and the second resin are selected from a group consisting of a polyester resin, a polycarbonate resin and a combination thereof.

MB Formation

During MB (master batch) formation, a silicone composition and a first resin are compounded to form a master batch. In an embodiment, the silicone composition and the first resin are melted and blended to form a master batch. In another embodiment, MB formation is carried out at a temperature ranging from about 80° C. to about 400° C., preferably about 200° C. to about 400° C., more preferably from about 220° C. to about 350° C., and even more preferably from about 240° C. to about 300° C.

The silicone composition may be present in the master batch in an amount of less than 50 wt %, such as from about 5 wt % to about 45 wt %. In a preferred embodiment, the silicone composition is present in the master batch in an amount of from about 8 wt % to 40 wt %, preferably from about 10 wt % to about 35 wt %, and particularly preferably from about 10 wt % to about 30 wt %. All the percentages of the silicone composition are based on 100% by weight of the master batch.

The silicone composition used in MB formation comprises a polyorganosiloxane and a silicone resin soluble in the polyorganosiloxane. In an embodiment, the weight ratio of the polyorganosiloxane to the silicone resin may vary within a wide range, provided that the silicone resin is dissolved in the polyorganosiloxane to form a silicone fluid. For example, the weight ratio of the polyorganosiloxane to the silicone resin may be about 99:1 to about 50:50, about 90:10 to about 60:40, or about 80:20 to about 70:30. In a preferred embodiment, the silicone composition is a high viscosity silicone fluid, and preferably has a viscosity at 25° C. of about 200,000-900,000 cps. The viscosity of the silicone composition is measured at 25° C. using HBDV-I Prime Digital Brookfield Closed Cup Viscometer with cone spindle CPE-52, with the revolution per minute adjusted to operate between 70%-90% torque.

The silicone resin in the silicone composition contains one or more M units of the formula $R_3SiO_{1/2}$ and one or more Q units of the formula $SiO_{4/2}$, and optionally contains, one or more D units of the formula $R_2SiO_{2/2}$ and one or more T units of the formula $RSiO_{3/2}$ wherein each R is independently a monovalent hydrocarbon group having about 1-60 carbon atoms.

Suitable monovalent hydrocarbon groups for the silicone resin include an alkyl, an alkoxyl, an aryl, and an aralkyl. In a preferred embodiment, the monovalent hydrocarbon group is selected from the group consisting of an alkyl having 1-6 carbon atoms, an alkoxyl having 1-6 carbon atoms, an aryl having 6-12 carbon atoms and an aralkyl having 7-13 carbon atoms. In a preferred embodiment, each R is independently an alkyl having 1-6 carbon atoms or a phenyl.

In a preferred embodiment, the silicone resin is comprised of one or more M units of the formula $R_3SiO_{1/2}$, one or more Q units of the formula $SiO_{4/2}$, and one or more T units of the formula $RSiO_{3/2}$. In a more preferred embodiment, the silicone resin is a MQ resin composed of M and Q units. In a preferred M unit for the MQ resin, each R is independently an alkyl having 1-4 carbon atoms, preferably methyl.

In an embodiment, the polyorganosiloxane in the silicone composition has the formula:

$$M^1_a M^2_b D^1_c D^2_d T^1_e T^2_f Q_g$$

wherein:
$M^1=R^1R^2R^3SiO_{1/2}$
$M^2=R^4R^5R^6SiO_{1/2}$
$D^1=R^7R^8SiO_{2/2}$
$D^2=R^9R^{10}SiO_{2/2}$
$T^1=R^{11}SiO_{3/2}$
$T^2=R^{12}SiO_{3/2}$
$Q=SiO_{4/2}$ wherein, $R^1$, $R^2$, $R^3$, $R^5$, $R^6$, $R^7$, $R^8$, $R^{10}$ and $R^{11}$ are each independently a monovalent hydrocarbon group having 1-60 carbon atoms; $R^4$, $R^9$ and $R^{12}$ are each independently selected from the group consisting of hydrogen, hydroxyl and alkoxyl having 1-12 carbon atoms; and the subscripts a, b, c, d, e, f, g are zero or positive integers subject to the following limitations: $3 \leq a+b+c+d+e+f+g \leq 1000$.

In a preferred embodiment, the polyorganosiloxane has the formula:

$$M^3_h M^4_i D^5_j D^6_k$$

wherein:
$M^3=R^{11}R^{12}R^{13}SiO_{1/2}$
$M^4=R^{14}R^{15}R^{16}SiO_{1/2}$
$D^5=R^{17}R^{18}SiO_{2/2}$
$D^6=R^{19}R^{20}SiO_{2/2}$ wherein, $R^{11}$, $R^{12}$, $R^{13}$, $R^{15}$, $R^{16}$, $R^{17}$, $R^{18}$ and $R^{20}$ are each independently a monovalent hydrocarbon group having 1-60 carbon atoms; $R^{14}$ and $R^{19}$ are each independently hydroxyl or alkoxyl having 1-12 carbon atoms; and the subscripts h, i, j, k are zero or positive integers subject to the following limitations: $3 \leq h+i+j+k \leq 1000$.

In a more preferred embodiment, $R^{11}$, $R^{12}$, $R^{13}$, $R^{15}$, $R^{16}$, $R^{17}$, $R^{18}$ and $R^{20}$ are each independently selected from the group consisting of an alkyl having 1 to 6 carbon atoms, an aryl having 6 to 12 carbon atoms, and an aralkyl having 7 to 13 carbon atoms. In a more preferred embodiment, $R^{11}$, $R^{12}$, $R^{13}$, $R^{15}$, $R^{16}$, $R^{17}$, $R^{18}$ and $R^{20}$ are each independently an alkyl having 1-4 carbon atoms, particularly methyl.

In a preferred embodiment, $R^{14}$ and $R^{19}$ are each independently hydroxyl or alkoxyl having 1-6 carbon atoms. In a more preferred embodiment, both $R^{14}$ and $R^{19}$ are hydroxyl. In a still more preferred embodiment, $R^{14}$ is hydroxyl and k equals zero.

The silicone composition may be prepared, for example, by physically mixing the silicone resin with the polyorganosiloxane, or by dissolving the silicone resin in the polyorganosiloxane. The silicone composition may also be commercially available, for example, as under the trade name SFR100 from Momentive Performance Materials Inc.

SFR100 silicone fluid is typically known as a flame retardant, and is generally used with Group IIA metal organic salts to provide varying degrees of flame retardancy. It has been surprisingly found that SFR100 silicone fluid formulated into a master batch greatly improved the impact strength of polycarbonate or polyester resin products, but when a Group IIA metal organic salt is blended into the resin composition even at a very low concentration (such as 0.05 wt % based on 100 wt % of the resin composition), the improvement was lost. Therefore, in an embodiment of the invention, the resin composition is substantially free of a metal organic salt, preferably free of a Group IIA metal organic salt, such as magnesium stearate. In another embodiment, the resin composition contains less than about 0.05 wt % of the metal organic salt based on 100 wt % of the resin composition. In yet another embodiment, the resin composition contains less than about 0.02 wt % of the metal organic salt and in still yet another embodiment contains less than about 0.01 wt % of a Group IIA metal organic salt, based on 100 wt % of the resin composition.

In an embodiment, the first resin includes a resin containing an ester group (C=O). In a preferable embodiment, the first resin is selected from a group consisting of a polyester resin, a polycarbonate resin and a combination thereof.

The first polycarbonate resin used in the MB formation is not particularly limited, and may be any polycarbonate resin known in the art. Examples of polycarbonate resins may include aromatic polycarbonates and aromatic polyester carbonates or a combination thereof. In a preferred embodiment, the first polycarbonate resin is an aromatic polycarbonate resin. The first polycarbonate resin may be one aromatic polycarbonate resin alone, or may be a mixture of two or more aromatic polycarbonate resins made from different monomers, or made from the same monomers but having different molecular weights and/or different melt indices.

The aromatic polycarbonate resin may be prepared through any method known to one of ordinary skill in the art. Reference can be made to, for example, Schnell, "Chemistry and Physics of Polycarbonates", Interscience Publishers, 1964, which is incorporated by reference in its entirety herein. For example, the aromatic polycarbonate resin may be prepared by reacting a diphenol compound with a phosgene compound, a halogen acid ester compound, a carbonic acid ester compound, or combinations thereof. The diphenol compound may be, but is not particularly limited to, for example 4,4'-dihydroxydiphenyl, 2.2-bis(4-hydroxyphenyl)-propane, 2,4-bis(4-hydroxyphenyl)-2-methylbutane, 1,1-bis-(4-hydroxyphenyl)-cyclohexane, 2,2-bis-(3-chloro-4-hydroxyphenyl)-propane, or 2,2-bis-(3,5-dichloro-4-hydroxyphenyl)-propane. In a preferred embodiment, the diphenol compound is 2,2-bis-(4-hydroxyphenyl)-propane as bisphenol A.

In a preferred embodiment, the first polycarbonate resin is a high viscosity polycarbonate resin. The high viscosity polycarbonate resin has low fluidity with a low melt index (MI) of, for example, less than 10 g/10 min at the temperature of 300° C. and under the loading of 1.2 kg according to ISO 1133. In a preferred embodiment, the first polycarbonate resin has a melt index (MI) of, for example, 9 g/10 min, 7.5 g/10 min, 6.5 g/10 min, or 5 g/10 min at the temperature of 300° C. and under the loading of 1.2 kg according to ISO 1133. A mixture of two or more polycarbonate resins having different melt indices may be used together to achieve the target melt index. Specifically, the polycarbonate resin may be a mixture of two of more selected from aromatic polycarbonate resins having a melt index (MI) of 7.5 g/10 min, 6.5 g/10 min, and/or 5 g/10 min at the temperature of 300° C. and under the loading of 1.2 kg according to ISO 1133.

The first polycarbonate resin may also be any commercially available polycarbonate resin, used either alone or in a combination.

The first polyester resin used in the MB formation is not particularly limited, and may be, any polyester resin known in the art, for example, a polyester resin synthesized from polycarboxylic acid and polyol. The polycarboxylic acid includes, but is not limited to, dicarboxylic acid, and trivalent to hexavalent, or higher polycarboxylic acid. In an embodiment, the dicarboxylic acid includes aliphatic dicarboxylic acid such as a linear-chain aliphatic dicarboxylic acid and a branched-chain dicarboxylic acid; aromatic dicarboxylic acid; and a combination thereof. The polyol includes, but is not limited to, diol, trihydric to octahydric or higher polyol. In an embodiment, the diol includes an aliphatic diol such as a linear-chain aliphatic diol and a branched-chain aliphatic diol; an alkylene ether glycol; an alicyclic diol; an alkylene oxide adduct of the alicyclic diol; an alkylene oxide adduct of bisphenol; and a combination thereof.

In an embodiment, the first polyester resin is synthesized from a dicarboxylic acid and a diol. In another embodiment, the first polyester resin is synthesized from an aromatic dicarboxylic acid and an aliphatic diol. In a preferred embodiment, the first polyester resin is selected from the group consisting of polyethylene terephthalate, polyethylene phthalate, polyethylene isophthalate, polybutylene terephthalate, polybutylene phthalate, polybutylene isophthalate, and a combination thereof.

The compounding step of MB formation may be carried out in a device selected from the group consisting of an extruder, a thermal press, a Banbury mixer, a two-roll mill, an injection machine, or other melt blending device effective to provide a homogeneous composition. In a preferred embodiment, an extruder is used to perform the MB formation step.

The extruder may be a conventional extruder generally used in processing thermal plastic resins. The examples of the extruder include but are not limited to a single screw extruder, a twin-screw extruder, and a multi-screw extruder. In a preferred embodiment, the silicone composition and the first resin are melted and blended in a twin-screw extruder. The temperatures in each barrel (zone) of the twin-screw extruder and the rotating speed of the screw can be determined according to the materials to be extruded.

Generally, the barrel temperatures typically range from about 80° C. to about 400° C. The downstream barrel temperatures should be lower, for example, from about 80° C. to about 200° C., preferably from about 100° C. to about 160° C. The upstream barrel temperatures should be higher, for example, from about 200° C. to about 400° C., preferably from 220° C. to about 300° C. Generally, the screw rotates at speed ranging from about 200 rpm to about 500 rpm, typically about 250 to about 450 rpm.

MB Blending

In MB blending, the master batch obtained in MB formation and a second resin are compounded to form a resin composition. Additives generally used for a resin may also be compounded with the master batch and the second resin. In an embodiment, MB blending is carried out at a temperature ranging from about 80° C. to about 400° C., preferably about 200° C. to about 400° C., more preferably from about 220° C. to about 350° C., and even more preferably from about 240° C. to about 300° C.

Generally, the amount of the master batch to be blended with the second resin is not particularly limited, and depends on the concentration of the silicone composition in the master batch and also the desired concentration of the silicone composition to be present in the resultant resin composition. Generally, the master batch is introduced into the resin composition in an amount of less than about 20 wt %, such as from about 0.1 wt % to about 15 wt %. In a preferred embodiment, the master batch is introduced into the resin composition in an amount of from about 0.5 wt % to 10 wt %, preferably from about 0.8 wt % to about 8 wt %, and particularly preferably from about 1 wt % to about 7.5 wt %, based on 100% by weight of the resin composition.

In an embodiment, the second resin includes a resin containing an ester group (C=O). In a preferable embodiment, the second resin is selected from a group consisting of a polyester resin, a polycarbonate resin and a combination thereof.

The second polycarbonate resin used in MB blending is not particularly limited, and may be any polycarbonate resin known in the art. Examples of polycarbonate resins may include aromatic polycarbonates and aromatic polyester carbonates or combinations thereof. In a preferred embodiment, the second polycarbonate resin is an aromatic polycarbonate resin. The second polycarbonate resin may be one aromatic polycarbonate resin alone, or may be a mixture of two or more aromatic polycarbonate resins made from different monomers, or made from the same monomers but having different molecular weights and/or different melt indices.

The second polyester resin used in the MB blending is not particularly limited, and may be, any polyester resin known in the art, for example, a polyester resin synthesized from polycarboxylic acid and polyol. In an embodiment, the second polyester resin is synthesized from a dicarboxylic acid and a diol. In another embodiment, the second polyester resin is synthesized from an aromatic dicarboxylic acid and an aliphatic diol. In a preferred embodiment, the second polyester resin is selected from the group consisting of polyethylene terephthalate, polyethylene phthalate, polyethylene isophthalate, polybutylene terephthalate, polybutylene phthalate, polybutylene isophthalate, and a combination thereof.

In an embodiment, the second resin used in MB blending may be the same as or different from the first resin used in MB formation. If a mixture of different resins is used as the first and/or the second resins, the second resin may also be partially or completely different from the first resin. In a preferred embodiment, the first and the second resins are at least partially the same, and particularly, completely the same.

The description with regard to the first resins in the section of MB formation may also apply to the second resins.

The compounding step of MB blending may be carried out in a device selected from the group consisting of an extruder, a thermal press, an injection machine, a Banbury mixer, a two-roll mill, or other melt blending device effective to provide a homogeneous composition. In a preferred embodiment, the MB blending is performed in an extruder.

The extruder may be a conventional extruder generally used in processing thermal plastic resins. The examples of the extruder include, but are not limited to, a single screw extruder, a twin-screw extruder, and a multi-screw extruder. In a preferred embodiment, the master batch and the second resin with optional additives(s) as needed are melted and blended in a twin-screw extruder. The temperatures in each barrel (zone) of the twin-screw extruder and the rotating speed of the screw can be determined according to the materials to be extruded.

Generally, the barrel temperatures typically range from about 80° C. to about 400° C. The downstream barrel temperatures should be lower, for example, from about 80° C. to about 200° C., preferably from about 100° C. to about 160° C. The upstream barrel temperatures should be higher, for example, from about 200° C. to about 400° C., preferably from 220° C. to about 300° C. Generally, the screw rotates at speed ranges from about 200 rpm to about 500 rpm, typically about 250 to about 450 rpm.

The resin composition may further include other additives typically used in addition to the impact modifier of silicone composition with the proviso that the additives are selected so as not to adversely affect the desired properties of the resin composition or the molded article. The examples of the additives include, but are not particularly limited to, one or more of an antioxidant, a heat stabilizer, a photostabilizer or UV stabilizer, and an antistatic agent. The additives may be used in a total amount of 0.0001 to 1 percent by weight, based on the total weight of the resin composition.

Suitable antioxidant additives include, for example, organophosphites such as tris(nonyl phenyl) phosphite, tris (2,4-di-t-butylphenyl) phosphite, bis(2,4-di-t-butylphenyl) pentaerythritol diphosphite, distearyl pentaerythritol diphosphite or the like; alkylated monophenols or polyphenols; alkylated reaction products of polyphenols with dienes; alkylated hydroquinones; hydroxylated thiodiphenyl ethers; alkylidene-bisphenols; benzyl compounds; esters of thioalkyl or thioaryl compounds; or a combination thereof.

Suitable heat stabilizer additives include, for example, organophosphites such as triphenyl phosphite, and tris-(2, 6-dimethylphenyl)phosphite; phosphonates such as dimethylbenzene phosphonate; phosphates such as trimethyl phosphate; or a combination thereof.

Suitable photostabilizers or UV stabilizers include, for example, benzotriazoles such as 2-(2-hydroxy-5-methylphenyl)benzotriazole and 2-(2-hydroxy-5-tert-octylphenyl)-benzotriazole; hydroxybenzophenones such as 2-hydroxy-4-n-octoxy benzophenone; hydroxybenzotriazoles; hydroxybenzotriazines; cyanoacrylates; oxanilides; benzoxazinones; or a combination thereof.

Suitable antistatic agents include, for example, conductive blacks, carbon fibres, carbon nanotubes, glycerol monostearate, glycerol distearate, glycerol tristearate, ethoxylated amines, ethoxylated alcohols, alkyl sulfates, alkylarylsulfates, alkylphosphates, alkylaminesulfates, quaternary ammonium salts, quaternary ammonium resins, imidazoline derivatives, sorbitan esters, ethanolamides, betaines; or a combination thereof.

The resin composition obtained in accordance with the method of the present invention may have greatly improved impact strength with a very low concentration of the impact modifier of the silicone composition. For example, the silicone composition is present in an amount of less than about 2 parts by weight in the resin composition, preferably about 0.05 to about 2 parts by weight, more preferably about 0.1 to about 1.5 parts by weight, or even about 0.1 to about 0.5 parts by weight, based on 100 parts by weight of the resin composition. Surprisingly, the resin composition of the present invention, when molded into an article, has a Notched Izod impact strength which is at least four times of the Notched Izod impact strength of the starting resin without adding the silicone composition.

Molding Step

The method of the present invention may further comprise molding the resin composition into a desired shape. The processes for molding the resin composition are well known in the art. Examples of the molding processes used in the present invention include, but are not limited to, injection molding, extrusion molding, rotational molding, blow molding and thermoforming and the like. In an embodiment, the polycarbonate or the polyester is molded by injection molding.

In a preferred embodiment, the molding process includes pre-drying the resin composition to a final moisture content of at most 0.02 wt %, for example by standing at a temperature of about 100-150° C. for about 1 to 5 hour, melting the pre-dried resin composition at a temperature of about 200° C. to about 350° C., and extruding or injecting the resin composition from a nozzle at a temperature of about 250° C. to about 350° C.

Resin Composition

In an aspect, the present invention relates to a resin composition comprising:
  a master batch, wherein the master batch comprises a first resin compounded with a silicone composition; and
  a second resin compounded with the master batch, and
  wherein the resin composition when molded into an article has a tensile strength of at least about 60 MPa according to ASTM D638 at 25° C. and a Notched Izod impact strength of at least about 65 KJ/m$^2$ according to ASTM D256 at 25° C.

In another aspect, the present invention relates to a resin composition comprising:
  a master batch, wherein the master batch comprises a first resin compounded with a silicone composition; and
  a second resin compounded with the master batch, and
  wherein the resin composition includes about less than 0.05 wt % of a metal organic salt.

In an embodiment, the first resin and the second resin are each independently a resin containing an ester group (C═O). In another embodiment, the first resin and the second resin are selected from a group consisting of a polyester resin, a polycarbonate resin and a combination thereof. The description with regard to the first and second resins in the section of MB formation may also apply to the first and second resins herein.

Molded Articles

The molded article according to an embodiment of the present invention may take various shapes, and is not particularly limited. For example, the molded article may have any shape as desired, such as in a shape of particles, pellets, a film, a sheet, a bar, a plate, or the like. In a particular embodiment, the molded article may be prepared in the shape of a pellet via melt extrusion of the resin composition using an extruder.

The molded article of the present invention has a Notched Izod impact strength which is at least four times of the Notched Izod impact strength of the starting resin without adding the silicone composition. Yet, this surprisingly high impact strength is achieved with very low amount of the silicone composition as the impact modifier. The silicone composition is present in an amount of less than about 2 parts by weight in the molded article, more preferably about 0.1 to about 1.5 parts by weight, or even about 0.1 to about 0.5 parts by weight, based on 100 parts by weight of the molded article.

The molded article of the present invention having greatly improved impact strength can be used in a wide variety of applications such as in electronic components, construction materials, data storage, automotive, aircraft, railway, and security components, for example, battery chargers and adaptors, calculators, remote controls, multi-functional cellular telephones, personal digital assistants (PDAs), laptop computers, wireless mouses, computer keyboards, on-board navigation devices for automobiles or other vehicles, lavatory sensors, security sensors, and the like.

In particular, the molded article according to the present invention can be suitable for parts for the interior finishing of railway vehicles, ships, aircraft, buses and other motor vehicles; casings for electrical devices; casings for devices for processing and transmitting information; casings and coverings for medical devices, massage devices and casings; toy vehicles for children; prefabricated wall panels; casings for security devices; heat-insulated transport containers; moldings for sanitary and bathroom fittings, cover grids for ventilator openings; and casings for garden equipment.

EXAMPLES

The present invention will be more specifically explained with reference to Examples, but these Examples shall not be construed as to limit the scope of the present invention. In the descriptions below, moreover, "part(s)" denotes "part(s) by weight" unless otherwise stated.

The materials used in the Examples are listed below.

| Materials | Trade Name | Description |
|---|---|---|
| polycarbonate resin | MAKROLON 3106 (available from Covestro) | a high viscosity polycarbonate; MFI at 300° C. and 1.2 kg loading is 6.5 g/10 min |
| silicone composition | SFR 100 (available from Momentive) | a silicone fluid with MQ resin dissolved in silanol terminated polydimethylsiloxane |
| additive | PEPQ (available from BASF) | antioxidant for polycarbonate |
| additive | Magnesium Stearate | group IIA metal salt |

Examples 1 to 4: Preparation of Master Batches 1 to 4

MAKROLON 3106, SFR100 and magnesium stearate in varying amounts as shown in Table 2 were fed into a twin-screw extruder (Nanjing Zhongsen ZSE-35 mm). The screw was rotated at a speed of 400 RPM. The temperature in each zone is provided in Table 1. The resultant from the extruder was cooled to room temperature and pelleted. The pellets were dried at 120° C. for 3 hours and were used as a master batch (MB).

TABLE 1

| Zone | Temperature (° C.) |
|---|---|
| Zone 1 | 120 |
| Zone 2 | 260 |
| Zone 3 | 280 |
| Zone 4 | 280 |
| Zone 5 | 280 |
| Zone 6 | 280 |
| Zone 7 | 280 |
| Zone 8 | 280 |
| Zone 9 | 280 |
| Zone 10 | 280 |

TABLE 2

Formulations of Master Batches (unit: parts by weight)

| Components | Example 1 (MB 1) | Example 2 (MB 2) | Example 3 (MB 3) | Example 4 (MB 4) |
|---|---|---|---|---|
| SFR 100 | 10 | 20 | 30 | 20 |
| magnesium stearate | | | | 1 |
| MAKROLON 3106 | 90 | 80 | 70 | 79 |
| Total | 100 | 100 | 100 | 100 |

Examples 5 to 9 and Comparative Examples 1 to 2: Preparation of Polycarbonate Compositions MAKROLON 3106, SFR100 and each of the master batches in varying amounts as shown in Table 4 were fed into a twin-screw extruder (Nanjing Zhongsen ZSE-35 mm). The screw was rotated at a speed of 400 RPM. The temperature in each zone was provided in Table 3 below. The resultant from the extruder was cooled to room temperature and pelleted. The pellets were dried at 120° C. for 3 hours to obtain the polycarbonate composition.

TABLE 3

| Zone | Temperature (° C.) |
|---|---|
| Zone 1 | 120 |
| Zone 2 | 260 |
| Zone 3 | 280 |
| Zone 4 | 280 |
| Zone 5 | 280 |
| Zone 6 | 280 |
| Zone 7 | 280 |
| Zone 8 | 280 |
| Zone 9 | 280 |
| Zone 10 | 280 |

TABLE 4

Formulations of Polycarbonate Compositions (unit: parts by weight)

| Ex. No. | MB 1 | MB 2 | MB 3 | MB 4 | PEPQ | MAKROLON 3106 | SFR 100 |
|---|---|---|---|---|---|---|---|
| Ex. 5 | 10 | | | | 0.03 | 89.97 | |
| Ex. 6 | | 2.5 | | | 0.03 | 97.47 | |
| Ex. 7 | | 7.5 | | | 0.03 | 92.47 | |
| Ex. 8 | | 10 | | | 0.03 | 89.97 | |
| Ex. 9 | | | 3.33 | | 0.03 | 96.64 | |
| Comp. Ex. 1 | | | | | 0.03 | 99.97 | |
| Comp. Ex. 2 | | | | | 0.03 | 98.97 | 1 |

Evaluation

Each of the pellet compositions thus obtained was molded into a bar having a thickness of 4 mm, and evaluated for tensile strength and Notched Izod impact strength. The molding conditions were listed below.

| Zone | Temperature (° C.) |
|---|---|
| Hopper | 50 |
| Zone 1 | 250 |
| Zone 2 | 290 |
| Zone 3 | 290 |
| Nozzle | 280 |

Tensile strength was determined according to ASTM D638 at 25° C., and Notched Iozd impact strength was determined according to ASTM D256 at 25° C.

The measured results are reported in Table 5. The concentration of SFR100 in the molded bar and increasing of Notched Iozd impact strength relative to Comparative Example 1 are also listed.

TABLE 5

Tensile strength and Notched Izod impact strength

| | Concentration | Properties | | |
|---|---|---|---|---|
| | of SFR 100 in the molded bar (wt %) | Tensile strength (MPa) | Notched Izod impact strength (KJ/m²) | Increasing of Notched Izod impact strength |
| Ex. 5 | 1 | 62.8 | 72.7 | 4.63 |
| Ex. 6 | 0.5 | 72.5 | 81.7 | 5.20 |
| Ex. 7 | 1.5 | 65.1 | 71.6 | 4.56 |
| Ex. 8 | 2 | 65.4 | 70.7 | 4.50 |
| Ex. 9 | 1 | 67.0 | 75.1 | 4.78 |
| Comp. Ex. 1 | 0 | 63.8 | 15.7 | 1 |
| Comp. Ex. 2 | 1 | 62.9 | 16.4 | 1.04 |

As shown in Table 5, all of the molded bars have a tensile strength at substantially the same level. It is surprisingly found, however, that the molded bars prepared according to the present invention (Examples 5 to 9) all obtain a Notched Izod impact strength at least 4 times that of the initial polycarbonate resin, whereas the Notched Izod impact strength is only slightly increased if the silicone composition is introduced into the polycarbonate resin directly without forming a master batch beforehand. That is, the silicone composition formulated into a master batch according to the method of present invention greatly improved the impact strength of polycarbonate products.

It is also surprisingly found that among Examples 5 to 9, Example 6 having the lowest concentration (0.5 wt %) of the silicone composition achieves the highest Notched Izod impact strength which is more than five times of the initial polycarbonate resin. Besides, Example 8 having the highest concentration (2 wt %) of the silicone composition achieves Notched Izod impact strength no higher than the remaining Examples 5, 6, 7 and 9, which indicates that the present invention greatly reduced the use amount of the silicone composition as the impact modifier.

Example 10 and Comparative Example 3: Preparation of Polycarbonate Compositions

MAKROLON 3106 and the master batch 2 or 4 in varying amounts as shown in Table 6 were fed into a twin-screw extruder (Nanjing Zhongsen ZSE-35 mm). The screw was rotated at a speed of 400 RPM. The conditions were the same as those shown in Table 3. The resultant from the extruder was cooled to room temperature and pelleted. Both of the pellet compositions were dried at 120° C. for 3 hours and molded into a bar having a thickness of 4 mm. Both of the bars were evaluated for tensile strength according to ASTM D638 and Notched Izod impact strength according to ASTM D256 as discussed above. The measured results are reported in Table 6.

TABLE 6

Formulations of Polycarbonate Compositions (unit: parts by weight)

| | Example 10 | Comparative Example 3 |
|---|---|---|
| MB 2 | 5 | |
| MB 4 | | 5 |
| PEPQ | 0.03 | 0.03 |
| MAKROLON 3106 | 94.97 | 94.97 |
| Properties | | |
| Tensile strength (MPa) | 62.6 | 61.4 |
| Notched Izod impact strength (KJ/m²) | 67.7 | 17.3 |

As shown in Table 6, although Example 10 achieved greatly improved impact strength like Examples 5-9, Comparative Example 3 which differed from Example 10 only in the incorporation of Group IIA metal organic salt into the master batch (at a concentration as low as 1 wt %) could not achieve the at least 4 times achievement of impact strength. Thus, in order to obtain an impact strength at least four times of the starting polycarbonate resin, Group IIA metal organic salt should be excluded from the silicone composition of the present invention.

The present invention provides, for example, the following embodiments.

1. A method for preparing a resin composition, comprising:
   (a) compounding a silicone composition with at least one first resin to form a master batch, the silicone composition comprising at least one polyorganosiloxane and at least one silicone resin soluble in the polyorganosiloxane; and
   (b) compounding the master batch with at least one second resin,
   wherein the first resin and the second resin are each independently selected from a group consisting of a polyester resin, a polycarbonate resin and a combination thereof.

2. The method of Embodiment 1, wherein the silicone resin contains one or more M units of the formula $R_3SiO_{1/2}$ and one or more Q units of the formula $SiO_{4/2}$, and optionally contains, one or more D units of the formula $R_2SiO_{2/2}$ and one or more T units of the formula $RSiO_{3/2}$ wherein each R is independently a monovalent hydrocarbon group having 1-60 carbon atoms.

3. The method of any of Embodiments 1 to 2, wherein the silicone resin is a MQ resin.

4. The method of any of Embodiments 1 to 3, wherein the polyorganosiloxane has the formula:

$$M^1{}_a M^2{}_b D^1{}_c D^2{}_d T^1{}_e T^2{}_f Q_g$$

wherein:
$M^1 = R^1 R^2 R^3 SiO_{1/2}$
$M^2 = R^4 R^5 R^6 SiO_{1/2}$
$D^1 = R^7 R^8 SiO_{2/2}$
$D^2 = R^9 R^{10} SiO_{2/2}$
$T^1 = R^{11} SiO_{3/2}$
$T^2 = R^{12} SiO_{3/2}$
$Q = SiO_{4/2}$
wherein, $R^1$, $R^2$, $R^3$, $R^5$, $R^6$, $R^7$, $R^8$, $R^{10}$ and $R^{11}$ are independently a monovalent hydrocarbon group having 1-60 carbon atoms; $R^4$, $R^9$ and $R^{12}$ are independently selected from the group consisting of hydrogen, hydroxyl and alkoxyl having 1-12 carbon atoms; and the subscripts a, b, c, d, e, f, g are zero or positive integers subject to the following limitations: $3 \leq a+b+c+d+e+f+g \leq 1000$.

5. The method of Embodiment 4, wherein $R^4$ is hydroxyl; and e, f, g are zero.

6. The method of any of Embodiments 1 to 5, wherein the silicone composition is present in an amount of less than about 2 parts by weight, preferably about 1 parts by weight or less, preferably about 0.5 parts by weight or less, in the resin composition, based on 100 parts by weight of the resin composition.

7. The method of any of Embodiments 1 to 6, wherein the silicone composition is present in an amount of 0.01 parts by weight or greater, for example about 0.02, 0.05, 0.07, 0.1, 0.2, 0.3, 0.4 parts by weight or greater in the resin composition, based on 100 parts by weight of the resin composition.

8. The method of any of Embodiments 1 to 7, wherein the resin composition comprises less than about 0.05 wt %, for example, about 0.04 wt % or less, about 0.03 wt % or less, about 0.02 wt % or less, or about 0.01 wt % or less of a metal organic salt, based on the total amount of the resin composition.

9 The method of any of Embodiments 1 to 8, wherein the resin composition is free of a metal organic salt.

10. The method of Embodiment 8 or 9, wherein the metal organic salt is a Group IIA metal organic salt.

11. The method of any of Embodiments 1 to 10, wherein the first resin is the same as the second resin.

12. The method of any of Embodiments 1 to 11, wherein a ratio of the first resin to the second resin is greater than about 1:60, about 1:50, about 1:45, about 1:40, about 1:35, about 1:30, about 1:25, about 1:20, about 1:15, about 1:10, or about 1:8.

13. The method of any of Embodiments 1 to 12, wherein a ratio of the first resin to the second resin is less than about 1:1, about 1:2, about 1:3, about 1:4, or about 1:5.

14. The method of any of Embodiments 1 to 13 wherein the resin composition when molded into an article has a tensile strength of at least about 60 MPa and a Notched Izod impact strength of at least about 70 $KJ/m^2$.

15. A resin composition comprising:
a master batch, wherein the master batch comprises a first resin compounded with a silicone composition; and
a second resin compounded with the master batch,
wherein the first resin and the second resin are each independently selected from a group consisting of a polyester resin, a polycarbonate resin and a combination thereof, and
wherein the resin composition when molded into an article has a tensile strength of at least about 60 MPa according to ASTM D638 at 25° C. and a Notched Izod impact strength of at least about 65 $KJ/m^2$ according to ASTM D256 at 25° C.

16. A resin composition comprising:
a master batch, wherein the master batch comprises a first resin compounded with a silicone composition; and
a second resin compounded with the master batch,
wherein the first resin and the second resin are each independently selected from a group consisting of a polyester resin, a polycarbonate resin and a combination thereof, and
wherein the resin composition includes about less than 0.05 wt % of a metal organic salt, based on the total amount of the resin composition.

17. The resin composition of Embodiment 15 or 16, wherein the silicone composition comprises at least one polyorganosiloxane and at least one silicone resin soluble in the polyorganosiloxane.

18. The resin composition of any of Embodiments 15 to 17, wherein the silicone resin contains one or more M units of the formula $R_3SiO_{1/2}$ and one or more Q units of the formula $SiO_{4/2}$, and optionally contains, one or more D units of the formula $R_2SiO_{2/2}$ and one or more T units of the formula $RSiO_{3/2}$ wherein each R is independently a monovalent hydrocarbon group having 1-60 carbon atoms.

19. The resin composition of any of Embodiments 15 to 18, wherein the silicone resin is a MQ resin.

20. The resin composition of any of Embodiments 15 to 19, wherein the polyorganosiloxane has the formula:

$$M^1{}_a M^2{}_b D^1{}_c D^2{}_d T^1{}_e T^2{}_f Q_g$$

wherein:
$M^1 = R^1 R^2 R^3 SiO_{1/2}$
$M^2 = R^4 R^5 R^6 SiO_{1/2}$
$D^1 = R^7 R^8 SiO_{2/2}$
$D^2 = R^9 R^{10} SiO_{2/2}$
$T^1 = R^{11} SiO_{3/2}$
$T^2 = R^{12} SiO_{3/2}$
$Q = SiO_{4/2}$
wherein, $R^1$, $R^2$, $R^3$, $R^5$, $R^6$, $R^7$, $R^8$, $R^{10}$ and $R^{11}$ are independently a monovalent hydrocarbon group having 1-60 carbon atoms; $R^4$, $R^9$ and $R^{12}$ are independently selected from the group consisting of hydrogen, hydroxyl and alkoxyl having 1-12 carbon atoms; and the subscripts a, b, c, d, e, f, g are zero or positive integers subject to the following limitations: $3 \leq a+b+c+d+e+f+g \leq 1000$.

21. The resin composition of Embodiment 20, wherein $R^4$ is hydroxyl; and e, f, g are zero.

22. The resin composition of any of Embodiments 15 to 21, wherein the silicone composition is present in an amount of less than about 2 parts by weight, preferably about 1 parts by weight or less, preferably about 0.5 parts by weight or less, in the resin composition, based on 100 parts by weight of the resin composition.

23. The resin composition of any of Embodiments 15 to 22, wherein the silicone composition is present in an amount of 0.01 parts by weight or greater, for example about 0.02, 0.05, 0.07, 0.1, 0.2, 0.3, 0.4 parts by weight or greater in the resin composition, based on 100 parts by weight of the resin composition.

24. The resin composition of any of Embodiments 15 to 23, wherein the resin composition comprises about 0.04 wt % or less, about 0.03 wt % or less, about 0.02 wt % or less, or about 0.01 wt % or less of a metal organic salt, based on the total amount of the resin composition.

25. The resin composition of any of Embodiments 15 to 24, wherein the resin composition is free of a metal organic salt.

26. The resin composition of Embodiment 24 or 25, wherein the metal organic salt is a Group IIA metal organic salt.

27. The resin composition of any of Embodiments 15 to 26, wherein the first resin is the same as the second resin.

28. The resin composition of any of Embodiments 15 to 27, wherein a ratio of the first resin to the second resin is greater than about 1:60, about 1:50, about 1:45, about 1:40, about 1:35, about 1:30, about 1:25, about 1:20, about 1:15, about 1:10, or about 1:8.

29. The resin composition of any of Embodiments 15 to 28, wherein a ratio of the first resin to the second resin is less than about 1:1, about 1:2, about 1:3, about 1:4, or about 1:5.

30. A molded article comprising the resin composition obtained according to the method of any of Embodiments 1-14 or the resin composition according to any of Embodiments 15-29.

31. A molded article comprising:

a master batch, wherein the master batch comprises a first resin compounded with a silicone composition; and a second resin compounded with the master batch, wherein the first resin and the second resin are each independently selected from a group consisting of a polyester resin, a polycarbonate resin and a combination thereof, and wherein the resin composition when molded into an article has a tensile strength of at least about 60 MPa according to ASTM D638 at 25° C. and a Notched Izod impact strength of at least about 65 KJ/m² according to ASTM D256 at 25° C.

32. Use of the master batch obtained in step (a) of any of Embodiments 1-14 as an impact modifier for improving impact strength of a resin product, wherein the resin is compounded with the masterbatch and is selected from a group consisting of a polyester resin, a polycarbonate resin and a combination thereof.

While the invention has been described with reference to particular embodiments, those skilled in the art will understand that various changes may be made and equivalents may be substituted for elements thereof without departing from the scope of the invention. It is intended that the invention not be limited to the particular embodiments disclosed but that it include all embodiments falling within the scope of the appended claims.

The invention claimed is:

1. A method for preparing a resin composition, comprising:
   (a) compounding a silicone composition with at least one first resin to form a master batch, the silicone composition comprising at least one polyorganosiloxane and at least one silicone resin soluble in the polyorganosiloxane, wherein a weight ratio of the at least one polyorganosiloxane to the at least one silicone resin is from about 99:1 to about 50:50, the silicone composition being present in the masterbatch in an amount of less than 50 wt. %; and
   (b) compounding the master batch with at least one second resin to form a resin composition,
   wherein the first resin and the second resin are each independently selected from a group consisting of a polyester resin, a polycarbonate resin, and a combination thereof; the resin composition comprises less than about 0.05 wt % of a metal organic salt, based on the total amount of the resin composition; and the silicone composition is present in the resin composition in an amount of 0.1 parts to less than about 2 parts by weight based on 100 parts by weight of the resin composition.

2. The method of claim 1, wherein the silicone resin contains one or more M units of the formula $R_3SiO_{1/2}$ and one or more Q units of the formula $SiO_{4/2}$, and optionally contains, one or more D units of the formula $R_2SiO_{2/2}$ and one or more T units of the formula $RSiO_{3/2}$ wherein each R is independently a monovalent hydrocarbon group having 1-60 carbon atoms.

3. The method of claim 1, wherein the silicone resin is a MQ resin.

4. The method of any of claim 1, wherein the polyorganosiloxane has the formula:

$$M^1{}_aM^2{}_bD^1{}_cD^2{}_dT^1{}_eT^2{}_fQ_g$$

wherein:
$M^1=R^1R^2R^3SiO_{1/2}$
$M^2=R^4R^5R^6SiO_{1/2}$
$D^1=R^7R^8SiO_{2/2}$
$D^2=R^9R^{10}SiO_{2/2}$
$T^1=R^{11}SiO_{3/2}$
$T^2=R^{12}SiO_{3/2}$
$Q=SiO_{4/2}$ wherein, $R^1$, $R^2$, $R^3$, $R^5$, $R^6$, $R^7$, $R^8$, $R^{10}$ and $R^{11}$ are independently a monovalent hydrocarbon group having 1-60 carbon atoms; $R^4$, $R^9$ and $R^{12}$ are independently selected from the group consisting of hydrogen, hydroxyl and alkoxyl having 1-12 carbon atoms; and the subscripts a, b, c, d, e, f, g are zero or positive integers subject to the following limitations: $3 \leq a+b+c+d+e+f+g \leq 1000$.

5. The method of claim 4, wherein $R^4$ is hydroxyl; and e, f, g are zero.

6. The method of claim 1, wherein the silicone composition is present in an amount of 0.1 to about 1.5 parts by weight, in the resin composition, based on 100 parts by weight of the resin composition.

7. The method of claim 1, wherein the silicone composition is present in an amount of 0.1 to 0.5 parts by weight, in the resin composition, based on 100 parts by weight of the resin composition.

8. The method of claim 1, wherein the resin composition is free of a metal organic salt.

9. The method of claim 1, wherein the metal organic salt is a Group IIA metal organic salt.

10. The method of claim 1, wherein the first resin is the same as the second resin.

11. The method of claim 1, wherein a ratio of the first resin to the second resin is greater than about 1:60.

12. The method of claim 1, wherein a ratio of the first resin to the second resin is less than about 1:1.

13. The method of claim 1 wherein the resin composition when molded into an article has a tensile strength of at least about 60 MPa and a Notched Izod impact strength of at least about 70 KJ/m$^2$.

* * * * *